April 21, 1925.
J. B. BAMBENEK
CHAIN FASTENER
Filed Oct. 15, 1923
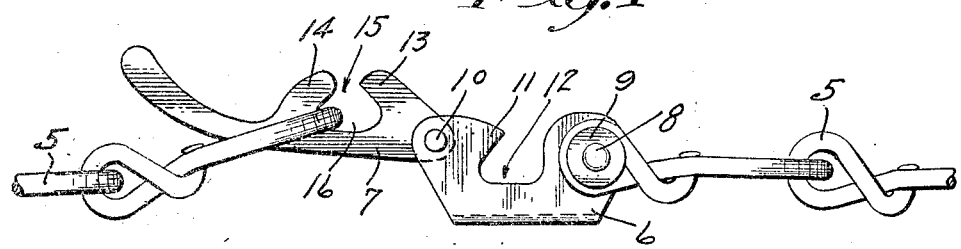
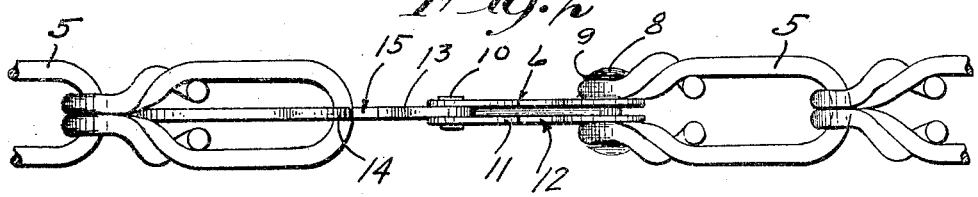
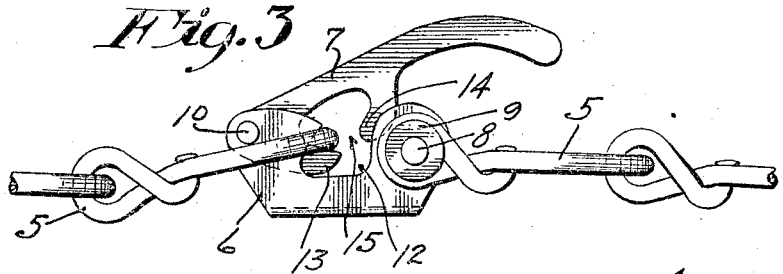
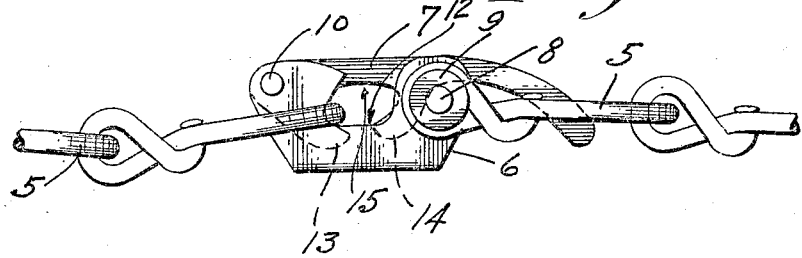
Inventor
Joseph B. Bambenek
By his Attorneys
Merchant & Kilgore Patented Apr. 21, 1925.

1,534,889

UNITED STATES PATENT OFFICE.

JOSEPH B. BAMBENEK, OF WINONA, MINNESOTA, ASSIGNOR TO PEERLESS CHAIN CO., OF WINONA, MINNESOTA.

CHAIN FASTENER.

Application filed October 15, 1923. Serial No. 668,594.

*To all whom it may concern:*

Be it known that I, JOSEPH B. BAMBENEK, a citizen of the United States, residing at Winona, in the county of Winona and State of Minnesota, have invented certain new and useful Improvements in Chain Fasteners; and I do hereby declare the following to be a full, clear, and exact description of the invention, such as will enable others skilled in the art to which it appertains to make and use the same.

My invention provides an extremely simple and highly efficient chain fastener for tire chains, and, generally stated, it consists of the novel devices and combinations of devices hereinafter described and defined in the claim.

The improved chain fastener comprises a shackle and a lever pivoted thereto. The shackle is made from a flat piece of sheet metal bent into a flat U-shaped cross section and provided with a hook-like retaining lug, and the lock lever, which is pivoted thereto, is provided with reversely acting chain-engaging lugs or hooks spaced far enough apart at their ends to permit the insertion of a chain link. The fastener involves other important novel features, as will appear from the description of the commercial form thereof illustrated in the accompanying drawings, wherein like characters indicate like parts throughout the several views.

Referring to the drawings:

Fig. 1 is a side elevation, showing one of my improved chain fasteners applied to connect the ends of a chain;

Fig. 2 is a plan view of the parts shown in in Fig. 1;

Fig. 3 is a view corresponding to Fig. 1, but showing the lock lever in an intermediate position; and Fig. 4 is a view corresponding to Fig. 3, but showing the lock lever in a completely closed position.

The numeral 5 indicates a chain, the end portions only of which are shown. This chain may be assumed to be one of the two laterally spaced chains of a complete tire chain, the cross chains of which are not shown.

The shackle 6, which, as above stated, is made from a flat piece of sheet metal, preferably steel, is bent into U-shaped cross section with its sides parallel and quite close together, being spaced only far enough to receive between them the lock lever 7. This shackle, at one end, is pivotally connected to one of the end links of the chain 5 by a rivet 8 and washer 9. The lever 7 is pivoted to the opposite ends of the shackle by a rivet 10 located near the outer edges of the side flanges of said shackle. Inward of the rivet 10, the side flanges of the shackle are formed with pointed retaining lugs 11, and still inward thereof, said side flanges are cut away to form a link-receiving pocket 12.

The lever 7, extending radially from its pivot, is provided with a hook-like lug 13, and spaced therefrom, said lever is provided with a reversely extended and reversely acting hook-like lug 14. The lugs 13 and 14 are spaced to form a contracted passage 15 that leads to a link-receiving pocket 16. The free end of the lever 7 is curved or bent so that, when the lock lever is in closed position, it will project through the chain link to which the shackle is pivoted, as shown in Fig. 4, and, hence, will be guarded and protected so that it will not accidentally be opened, in the use of the chain on the tire.

When the lever is moved to an open position, it will, of course, move outward or away from the tire. It will, of course, be understood that when the chain is applied to a tire, the back or bow of the shackle 6 will be against the tire.

In the application of the complete tire chain to a tire, it will first be loosely placed around the tire and the loose links of the two chains will be connected onto the hook lugs 14 of the two levers, as shown in Fig. 1. This makes it an easy matter to first connect the ends of the inside chain to keep the tire chain partially positioned while the ends of the outside chain are being connected.

After the ends of the two side chains of the tire chain have been connected as shown in Fig. 1, it is an easy matter to turn the levers into closed positions, shown in Fig. 4, and now it is important to note that, when the levers are in closed position, the pull on the chain is decidedly inward of the axis of the pivot 10, so that the tighter the pull on the chains, the more securely will the said levers be held in their closed positions. Also, in this closed position of the lever, pull on the chain link will be against the lug 13 of the lever and against the beveled edges of the lugs 11 of the shackle, so that no force, either endwise or laterally, against the engaged link will tend to open the lever.

When, however, it is desired to disconnect the ends of the chain, this may be quickly done by forcing the lever outward or toward open position, and by reference to Fig. 3, it will be noted that, as the link is forced outward, it will be cammed against the beveled edges of the lugs 11 by the lug 13 and, by the latter, will be carried completely over and outward of said lugs 11, so that it is not necessary to engage the link with the hand. It has also already been pointed out that, when the lever is closed, its free end will be shielded by the link into which it is turned. Attention, however, is further called to the important fact that, even when the link is held by the opened lever, as shown in Fig. 1, there is no great probability of the said link becoming accidentally disconnected from the lever, because it is still held by the lug 14.

In actual practice, this chain fastener has been found to be highly efficient for the purposes had in view.

What I claim is:

The combination with the end links of a chain, of a chain fastener comprising a shackle formed of sheet metal bent into flat U-shaped cross section, the flanges of said shackle at one end being pivotal attached to one of said links, and a lock lever working between the flanges of said shackle and pivoted thereto at the end opposite to which the said link is pivotally attached, the flanges of said shackle being formed between said pivotal connections with an intermediate link-receiving pocket and with pointed retaining lugs projecting inward from the end to which said lever is pivoted, and said lever having reversely projecting hook lugs between said pivotal connections and spaced to afford a contracted entrance passage and a pocket adapted to receive the other or free chain link and to carry the same into the pocket of said shackle to a point inward of the lever pivot, the free end of the lever being curved in the same direction in which the hook lugs on said lever project, whereby when the fastener is applied to a chain, said curved end will be turned into the pivotally attached lug.

In testimony whereof I affix my signature.

JOSEPH B. BAMBENEK.